Patented Apr. 8, 1930

1,753,984

UNITED STATES PATENT OFFICE

GEORG ENSSLE, OF CONSTANCE, GERMANY, ASSIGNOR TO HOLZVERKOHLUNGS-INDUSTRIE AKTIENGESELLSCHAFT, OF CONSTANCE, BADEN, GERMANY, A CORPORATION OF GERMANY

METHOD OF ACTIVATING CHARCOAL

No Drawing. Application filed February 6, 1929, Serial No. 338,019, and in Germany January 13, 1928.

My invention relates to a method of activating charcoal whereby a highly active product is obtained in a simple and economical manner.

It is known that carbon dioxide may be employed for the activation of carbon-containing materials endothermically. Such activation is not satisfactorily accomplished by the use of carbon dioxide-containing gases which are produced, for instance, by the combustion of generator gas, or from flue gas, from which the last remaining traces of oxygen have been removed. When these gases are employed, the activation proceeds much too slowly and as a result of the practically unavoidable non-uniformity in size, texture, etc., of the material, there are present at an advanced stage of the process both poorly activated material and well activated material, so that the average activation is poor. If the activating period is increased the loss of already activated material becomes very large.

I have found that excellent results may be obtained and the above-mentioned disadvantages avoided by employing as the activating medium the so-called uncondensible gases resulting from the carbonization of wood in retorts, preferably the retorts in which the charcoal to be treated is being produced. These are oxygen-free gases containing over 40% of carbon dioxide, about 10% methane and about 30% carbon monoxide. The excellent results obtained by the use of these gases must be attributed mainly to their very high percentage of carbon dioxide and I have found that the full advantage of a mixture of gases containing carbon dioxide, when used for activating purposes, is not obtained unless the carbon dioxide content is at least 40%.

I have found further that equally good results may be obtained by the use of a mixture of gases which have a composition similar to the gases particularly described, that is, are oxygen-free, have a carbon dioxide content of at least 40%, and contain combustible gases. I do not, of course, claim the use of any mixture containing a gas which for any reason may be unsuitable for use in a mixture of activating gases. I may also use a mixture of the gases last described with gases resulting from the carbonization of wood in retorts.

The employment of a gas of the above-indicated character has still another advantage. Any oxygen that may pass into the interior of the activating retort from the atmosphere through holes or cracks in such retort can have no harmful effect on the charcoal as it is consumed by the combustible component of the activating gas mixture. Moreover, the heat of combustion so generated reduces the rather large amount of heat required for activating charcoal with carbon dioxide.

I have also found it of value to employ the gases for activation in a moist condition, or to charge additional quantities of steam into the retorts, whereby the thorough activation of the larger charcoal particles in particular is promoted.

Any known form of retort may be employed in carrying out my improved process, including a rotating tubular retort. The process may be carried out either continuously or non-continuously, as desired.

My improved process may be conducted in a manner similar to known processes for activating charcoal by means of gases, except that a gas of the composition indicated above is employed.

I claim:

The method of producing activated charcoal which comprises treating charcoal with a mixture of gases, free of oxygen, containing at least 40% of carbon dioxide and a substantial component of a combustible gas.

GEORG ENSSLE.